(No Model.)

W. I. BUNKER.
WHEEL.

No. 477,506. Patented June 21, 1892.

Witnesses:
Chas. E. Gayford
Clifford N. White

Inventor:
William I. Bunker,
By Banning & Banning & Payson,
Attys.

UNITED STATES PATENT OFFICE.

WILLIAM I. BUNKER, OF LA GRANGE, ILLINOIS.

WHEEL.

SPECIFICATION forming part of Letters Patent No. 477,506, dated June 21, 1892.

Original application filed October 7, 1890, Serial No. 367,354. Divided and this application filed March 29, 1892. Serial No. 426,906. (No model.)

*To all whom it may concern:*

Be it known that I, WILLIAM I. BUNKER, a citizen of the United States, residing at La Grange, Illinois, have invented certain new and useful Improvements in Wheels, of which the following is a specification, this application being a division of one heretofore filed by me on the 7th day of October, 1890, Serial No. 367,354.

My invention relates more particularly to the wheels of bicycles, baby-carriages, and similar light vehicles; and it consists in so forming the tires as to prevent the wheels from slipping sidewise, running over obstructions or out of a direct course, and in such manner as to distribute the weight more evenly. To accomplish these results, I provide a wheel in which the tire is composed of a cushion which is secured to the rim of the wheel by means of a suitable encircling band, and I shall hereinafter describe and show various forms which my invention takes.

Figure 2:
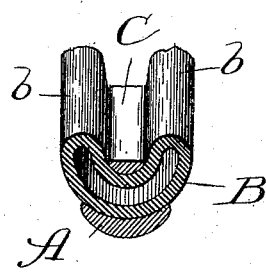
Figure 3:
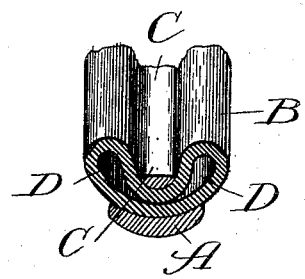
Figure 1:
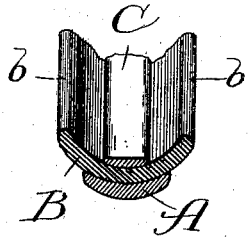
Figure 4:
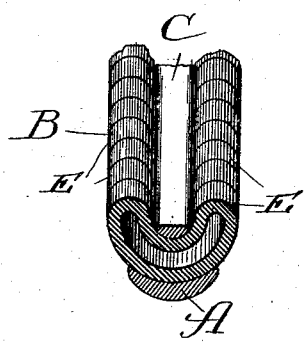

In the drawings, Figure 1 is a perspective sectional view of a portion of the rim and tire of a wheel provided with my invention, and Figs. 2, 3, and 4 are similar views illustrating modifications.

The hub and spokes of the wheel may be made in any desired manner, and being well known do not require illustration.

The rim A may be made in any suitable form adapted to receive and assist in retaining the tire. In the drawings I have shown it as made solid, with a concavo-convex section, with the concave side outward. In this rim is placed the tire B. In the form shown in Fig. 1 this consists of a strip of soft rubber or other suitable elastic material made of any desired width and of the proper length to encircle the wheel. This is held in place by means of a band C, which forces it into the concavity in the rim, turning the edges *b* outward, so as to form a bearing-surface at either side of the retaining-band. In Fig. 2 I have shown a form illustrating the same principle, but wherein the tire instead of consisting of a flat strip of suitable elastic material is made in the form of a tube, which is compressed by the encircling band into the shape shown.

In Fig. 3 is shown the same form as that in Fig. 2, except that the band is made so tight as to bring the inner sides of the tube into contact, forming air-chambers D at each side of the central line of the rim.

Fig. 4 illustrates a form almost identical with that in Fig. 2, with the exception that in place of a continuous tube I form the tire out of a series of short tubes or chambers E, closed at their ends and adapted to be held in place by the band C in the same manner as shown in Fig. 2; or, if desired, this band may be tightened in order to bring into contact the inner sides of these sections, as shown in Fig. 3, thereby forming a series of air-chambers at either side of the center line of the rim.

By this means I provide a simple easily-constructed wheel which is highly efficient in operation, which runs easily over the ground, and yet engages with it with sufficient firmness to prevent slipping; and while I have shown several forms embodying my invention I do not desire to unduly limit myself thereto, but contemplate changes in form, proportion, and the substitution of equivalent members as may be desirable or necessary.

I claim—

1. In a wheel, the combination of a rim, an elastic tire of greater breadth than the rim, secured to such rim, and a band encircling the tire and dividing it into one or more bearing-surfaces, such surfaces being located at either side of the center line of the rim and beyond the outer edges of such rim, substantially as described.

2. In a wheel, the combination of a rim, an elastic tire placed thereon, and a band encircling such rim and tire and holding the two together, such band being the sole means of causing the tire to present one or more bearing-surfaces upon either side of the center line of the rim, substantially as described.

3. In a wheel, the combination of a rim, a tubular tire, and a band encircling the tire, holding it to the rim and dividing it into one or more pneumatic cushions at either side of the center line of the rim, substantially as described.

4. In a wheel, the combination of a concave rim, a tire composed of a flat strip of elastic material, and a band encircling such tire and forcing it into the rim, compelling it to assume a concavo-convex shape, whereby one or more independent and separate bearing-surfaces are formed at either side of the center line of the rim, substantially as described.

5. In a wheel, the combination of a rim, a series of pneumatic cushions composing the tire, and a band encircling such cushions, securing them to the rim and compressing them to increase their elasticity and regulate the tension of the air, substantially as described.

WILLIAM I. BUNKER.

Witnesses:
GEORGE S. PAYSON,
EPHRAIM BANNING.